(12) United States Patent
Bhandari et al.

(10) Patent No.: US 9,953,015 B2
(45) Date of Patent: Apr. 24, 2018

(54) DISPLAYING A DOCUMENT FILE TARGET AREA BASED ON HISTORY OF DISPLAY SETTINGS

(71) Applicant: INTERNATIONAL BUSINESS MACHINES CORPORATION, Armonk, NY (US)

(72) Inventors: Sakura Bhandari, Yamato (JP); Ryoji Kurosawa, Tokyo (JP); Yoshinori Tahara, Yamato (JP); Asuka Unno, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 14/196,109

(22) Filed: Mar. 4, 2014

(65) Prior Publication Data

US 2014/0317491 A1 Oct. 23, 2014

(30) Foreign Application Priority Data

Apr. 23, 2013 (JP) ................................ 2013-090783

(51) Int. Cl.
*G06F 17/22* (2006.01)
*G06F 3/00* (2006.01)
*G06F 3/048* (2013.01)
*G06F 3/0481* (2013.01)

(52) U.S. Cl.
CPC .......... *G06F 17/2247* (2013.01); *G06F 3/048* (2013.01); *G06F 3/0481* (2013.01)

(58) Field of Classification Search
CPC ..... G06F 17/2247; G06F 3/0481; G06F 3/048
See application file for complete search history.

(56) References Cited

U.S. PATENT DOCUMENTS

| 8,549,431 | B2 | 10/2013 | Yabu et al. |
| 9,037,975 | B1* | 5/2015 | Taylor ............... G06F 17/30905 |
| | | | 715/733 |
| 9,183,258 | B1* | 11/2015 | Taylor ................. G06F 17/3053 |
| 2008/0252662 | A1* | 10/2008 | Hyatt .................... G06F 3/0481 |
| | | | 345/660 |
| 2011/0066678 | A1 | 3/2011 | Yano |
| 2013/0318431 | A1 | 11/2013 | Fujiwara et al. |

FOREIGN PATENT DOCUMENTS

| CN | 1815476 A | 8/2006 |
| EP | 2146291 A1 | 1/2010 |
| JP | H10133973 | 5/1998 |

(Continued)

*Primary Examiner* — Cesar Paula
*Assistant Examiner* — Konrad Kulikowski
(74) *Attorney, Agent, or Firm* — Christopher M. Coy

(57) ABSTRACT

A document file is displayed on a display device. A first display unit, which is a unit in which the document file is displayed, is divided into a plurality of areas. From the plurality of areas obtained by dividing the first display unit, a first target area viewed by a viewer is identified. In response to the first target area being displayed on the display device shifting from the first display unit to a second display unit, a decision is made whether to use setting information from the display area when the first target area identified by the identification means is displayed, based on a structure of the first display unit and a structure of the second display unit.

20 Claims, 9 Drawing Sheets

(56) References Cited

FOREIGN PATENT DOCUMENTS

| | | |
|---|---|---|
| JP | 2004199550 | 7/2004 |
| JP | 2006209538 A | 8/2006 |
| JP | 2007293543 A | 11/2007 |
| JP | 2007323369 | 12/2007 |
| JP | 2009009519 A | 1/2009 |
| JP | 2009176231 A | 8/2009 |
| JP | 2010020770 | 1/2010 |
| JP | 2011060215 | 3/2011 |
| JP | 2011253301 | 12/2011 |
| JP | 5039868 | 10/2012 |
| JP | 2013190918 A | 9/2013 |
| WO | WO2010134324 | 11/2010 |

* cited by examiner

FIG. 5
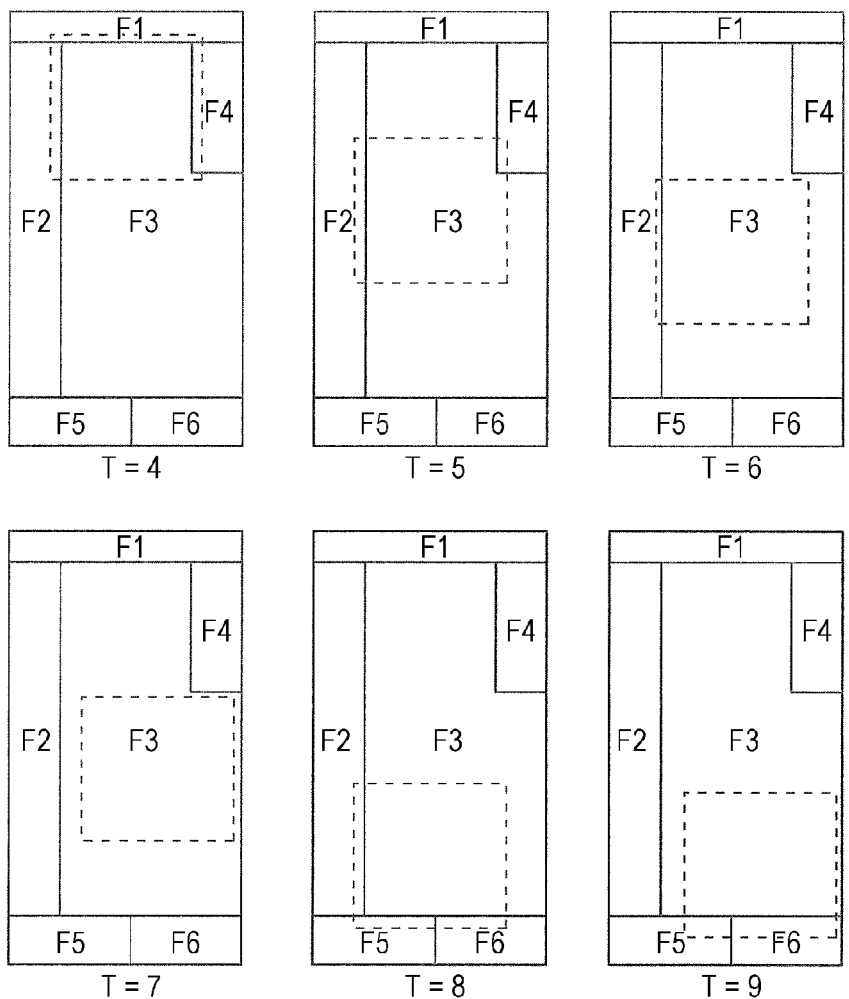
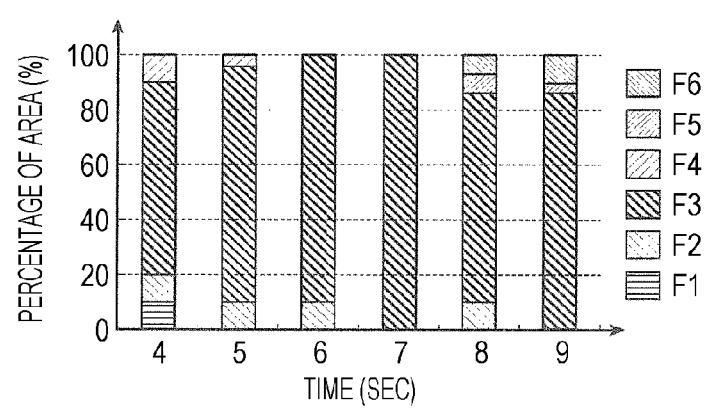

FIG. 6

Left column:
```
1  ▼ <div class="outBody">
2    ▼ <div class="inBody">
3      ▲ <style type="text/css">_</style>
4      ▼ <div>
5        ▲ <div class="header">_</div>
6        ▼ <div class="raincol">
7          ▲ <style type="text/css">_</style>
8          ▲ <div id="localNavigation">_</div>
9          ▼ <div class="newart">
10           ▲ <div class="navi">_</div>
11           ▲ <div class="headline">_</div>
12           ▼ <div id="trplMain">
13             ▲ <div class="pr-txt">_</div>
14             ▲ <div id="trplMark">_</div>
15             <!-- google_ad_section_start -->
16             ▼ <div id="trplBody">
17               ▼ <div class="inner">
18                 ▼ <p>
19                   "SNS SOCIAL NETWORKING SERVICES MANY OF WHICH WERE STARTED IN U.S, SUCH AS FACEBOOK AND TWITTER
20                   </p>
21                 ▲ <p>_</p>
22                 <!--CAP-->
23                 ▲ <div id="col300r">_</div>
24                 <!--CAPEMD-->
```

Right column:
```
1  ▼ <div class="outBody">
2    ▼ <div class="inBody">
3      ▲ <style type="text/css">_</style>
4      ▼ <div>
5        ▲ <div class="header">_</div>
6        ▼ <div class="raincol">
7          ▲ <style type="text/css">_</style>
8          ▲ <div id="localNavigation">_</div>
9          ▼ <div class="newart">
10           ▲ <div class="navi">_</div>
11           ▲ <div class="headline">_</div>
12           ▼ <div id="trplMain">
13             ▲ <div class="pr-txt">_</div>
14             ▲ <div id="trplMark">_</div>
15             <!-- google_ad_section_start -->
16             ▼ <div id="trplBody">
17               ▼ <div class="inner">
18                 ▲ <div class="ctrl" id="end">_</div>
19                 ▼ <p>
20                   <strong>-- THE SERVICE IS STARTED IN LAST AUGUST </strong>
21                   </p>
22                 ▼ <p>
23                   "NO.1 SERVICE WILL BE CREATED FOR SMARTPHONE IN THE LATTER HALF OF 201C
24                   </p>
```

FIG. 9
(a)
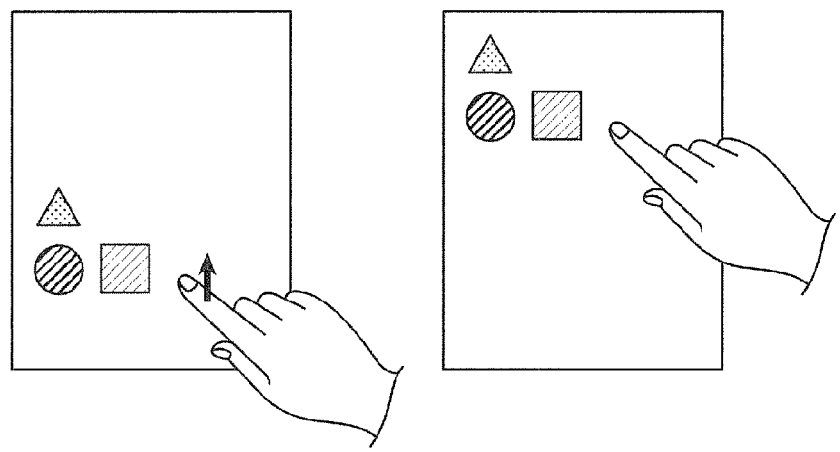
(b)
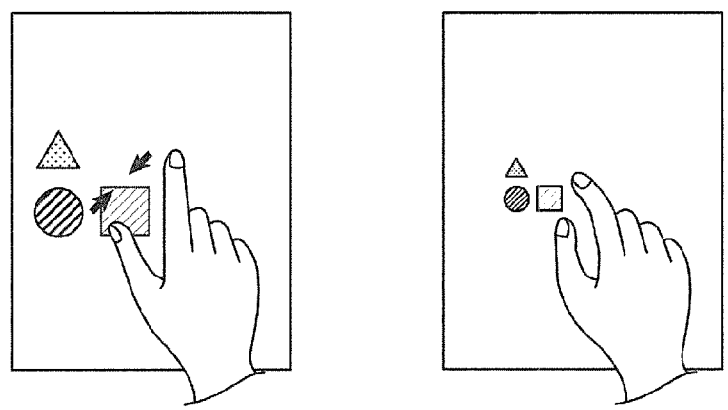
(c)
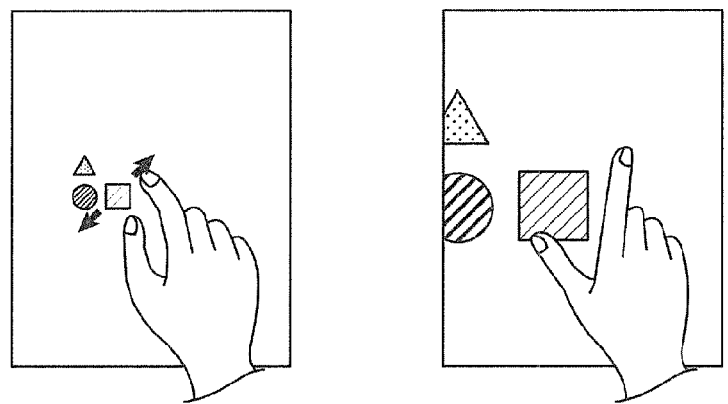

DISPLAYING A DOCUMENT FILE TARGET AREA BASED ON HISTORY OF DISPLAY SETTINGS

This application is based on and claims the benefit of priority from Japan (JP) Patent Application 2013-090783, filed on Apr. 23, 2013, and herein incorporated by reference in its entirety.

BACKGROUND

The present invention relates to a computers, and more specifically to computers used to display document files. Still more specifically, the present invention relates to adjusting a display of documents files being displayed on computers.

Browsing Web pages with a mobile phone, a smartphone, or a tablet terminal has recently increased. Such terminals have smaller display areas and downloadable file sizes than personal computers (PCs) and thus sometimes cannot express Web pages similarly to PCs. Thus, some techniques for achieving expression similar to that of PCs are present.

For example, a Web-page browsing system constitutes mobile terminals each having display means and a server connected to the mobile terminals. When one of the mobile terminals requests Web page data, the server receives its model name from the mobile terminal, acquires an optimum font size for the mobile terminal based on the received model name and the optimum font size that is connected thereto and stored in a memory, generates a viewing image based on the font size of the Web page and the optimum font size of the mobile terminal, and transmits the viewing image to the mobile terminal.

In another example, a Web site browsing system constitutes client terminals each having display means and a server connected to the client terminals. When one of the client terminals requests page content, the server extracts user interface (UI) information (a link tab, an input form, etc.) from a content file obtained from the external Web server, calculates a use rate serving as an index for determining the degree of necessity of the UI information for the client terminal based on the number of times that the UI information is used, extracts UI information having a high use rate calculated and surrounding images, and transmits them to the client terminal.

SUMMARY

In one embodiment of the present invention, a computer comprises: display hardware means for displaying a document file on a display device; partitioning hardware means for dividing a first display unit into a plurality of areas, wherein the first display unit is a unit in which the document file is displayed by the display hardware means; identification hardware means for identifying, from the plurality of areas obtained by the partitioning hardware means dividing the first display unit, a first target area viewed by a viewer based on a history of a display area actually being displayed on the display device in the first display unit; determination hardware means for determining, in response to the first target area being displayed on the display device shifting from the first display unit to a second display unit that is different from the first display unit, whether to use setting information from the display area when the first target area identified by the identification means is displayed, based on a structure of the first display unit and a structure of the second display unit; and decision hardware means for, in response to the determination hardware means deciding to use the setting information from the display area, deciding to display a second target area of the second display unit corresponding to the first target area by using the setting information from the display area, and in response to the determination hardware means deciding not to use the setting information from the display area, deciding to display the second display unit by using predetermined initial-setting information.

In one embodiment of the present invention, a method and/or computer program product displays a document file. A document file is displayed on a display device. A first display unit, which is a unit in which the document file is displayed, is divided into a plurality of areas. From the plurality of areas obtained by dividing the first display unit, a first target area viewed by a viewer is identified based on a history of a display area actually being displayed on the display device in the first display unit. In response to the first target area being displayed on the display device shifting from the first display unit to a second display unit that is different from the first display unit, a decision is made whether to use setting information from the display area when the first target area identified by the identification means is displayed, based on a structure of the first display unit and a structure of the second display unit. In response to deciding to use the setting information from the display area, a second target area of the second display unit corresponding to the first target area is displayed by using the setting information from the display area.

BRIEF DESCRIPTION OF THE SEVERAL VIEWS OF THE DRAWINGS

FIG. 5 is a diagram for explaining an example of a procedure for the viewing-area identification unit to identify a viewing area.

FIG. 6 is a diagram showing an example of the document structures of a source page and a destination page.

FIG. 9 is a diagram illustrating example contact actions on a touch panel.

Embodiments of the present invention will be described in detail hereinbelow with reference to the accompanying drawings.

DETAILED DESCRIPTION

Figure 1:
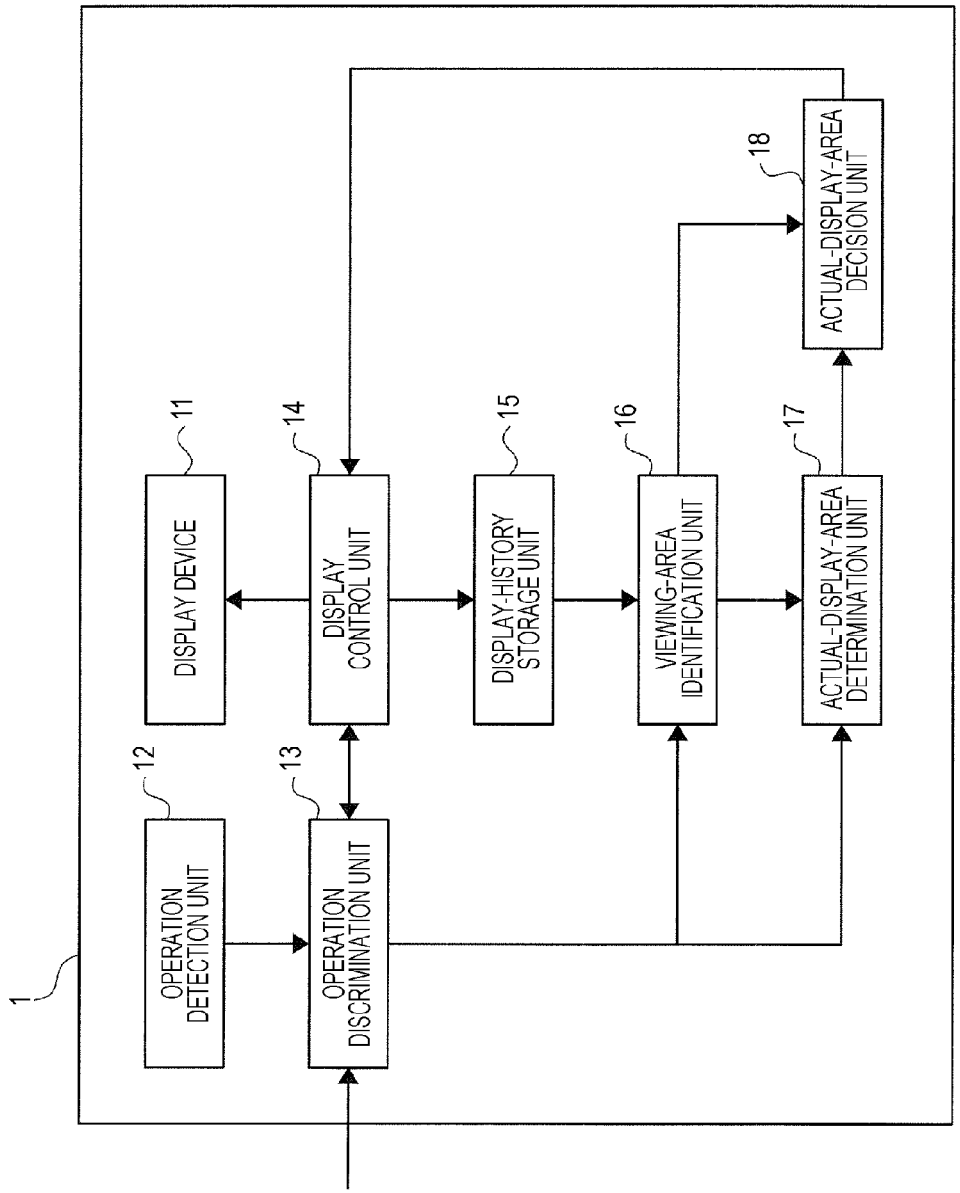
FIG. 1 is a block diagram illustrating an example of the functional configuration of a computer.

With reference now to the figures, and particularly FIG. 1, a block diagram illustrating an example of the functional configuration of a computer according to an embodiment of the present invention is presented. The computer 1 according to this embodiment includes, as functional components mainly for data inputting and outputting, a display device 11 that displays characters, graphics, or images in response to a control signal, an operation detection unit 12 that detects a contact action of the user, an operation discrimination unit 13 that determines the kind of the user's contact action, and a display control unit 14 that controls display on the display device 11. The computer 1 further includes, as functional components mainly for data processing, a display-history storage unit 15 that stores the moving history of a displayed area, a viewing-area identification unit 16 that identifies an area including a document that the user seems to have actually viewed, an actual-display-area determination unit 17 that determines whether to take over settings on the displayed area from the source page, and an actual-display-area decision unit 18 that decides the position and the scaling percentage of the displayed area. This embodiment assumes that the computer 1 is a terminal having a small display area. The computer 1 shown in FIG. 1 further includes a touch panel and corresponds to a personal digital assistant (a smartphone, a tablet terminal, etc.).

The display device 11 is a display device, such as a liquid crystal display and an organic electroluminescence (EL) display, and displays characters, graphics, or images in response to a control signal transmitted from the display control unit 14. The display device 11 displays the object in accordance with the user's contact action.

The operation detection unit 12, an example of detection means, detects a user's contact action on the display device 11 and transmits the detected contact action to the operation discrimination unit 13. For example, when a finger or a touch pen comes into contact with the display device 11, the operation detection unit 12 detects the contact. The detection means may be any means including detection means based on contact pressure and detection means based on the static electricity of a contact object. The operation detection unit 12 notifies the detection of the contact action and the position of the contact on the display device 11 to the operation discrimination unit 13 while the finger or the pen is in contact.

Figure 2:
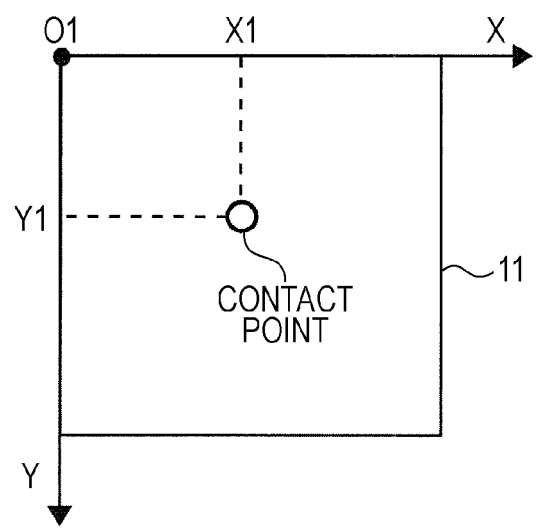
FIG. 2 is a diagram for explaining the position of contact on a display device.

FIG. 2 is a diagram for explaining the position of contact on the display device 11. Here, an orthogonal coordinate system is assumed for the display device 11. Let the upper left corner of the display device 11 be the origin O1 (0, 0), the horizontal coordinate of the display device 11 be an X-coordinate, and the vertical coordinate of the display device 11 be a Y-coordinate. If a finger comes into contact with the display device 11, the operation detection unit 12 detects the X-coordinate (X1) and the Y-coordinate (Y1) of the contact point and notifies the coordinates X1 and Y1 to the operation discrimination unit 13.

The operation discrimination unit 13, an example of the detection means, determines the kind of the contact action detected by the operation detection unit 12 and transmits the determined kind of the contact action and the contact position on the display device 11 to the display control unit 14. When notified of the detection of the contact action from the operation detection unit 12, the operation discrimination unit 13 determines the kind of the contact action based on the contact position on the display device 11. For example, when receiving a contact action such that the contact position moves upwards on the display device 11, as indicated by the arrow shown in FIG. 9(*a*), from the operation detection unit 12, the operation discrimination unit 13 determines that the action is an operation for moving the object displayed on the display device 11 upwards. The operation discrimination unit 13 notifies the determined operation and the contact position on the display device 11 to the display control unit 14. If two contact positions are present, and when the operation discrimination unit 13 receives a contact action such that the two positions are separated from each other from the operation detection unit 12, the operation discrimination unit 13 determines that the action is an operation for enlarging the object displayed on the display device 11. The operation discrimination unit 13 notifies the determined operation and the two contact positions on the display device 11 to the display control unit 14.

When the user shifts an initial Web page to a different Web page by, for example, selecting a hyperlink (hereinafter referred to as a link) displayed on the display device 11 or when the user starts a Web browser and newly displays a Web page, the operation discrimination unit 13 acquires document data on the destination Web page or document data on the newly displayed Web page. The operation discrimination unit 13 requests document data from the external server or a data storage area (not shown) in the computer 1 and acquires the document data. The hyperlink is a reference playing a role in linking a plurality of document data. The Web browser is an application for displaying Web pages. Here, although a Web page described in a HyperText Markup Language (HTML) document is taken as an example of a document file displayed on the display device 11, the present invention is not limited thereto.

The operation discrimination unit 13 acquires and holds document data displayed on the display device 11 and acquires information on an area of the document data actually displayed on the display device 11, (hereinafter the actually displayed area is referred to as an actual display area) based on a control signal generated by the display control unit 14. This allows the operation discrimination unit 13 to determine whether a link displayed on the display device 11 is selected by the user based on the contact action detected by the operation detection unit 12. If the operation discrimination unit 13 determines that a link is selected, the operation discrimination unit 13 notifies the fact to the viewing-area identification unit 16. The operation discrimination unit 13 also transmits the acquired document data to the display control unit 14 and the actual-display-area determination unit 17. Although the operation discrimination unit 13 determines whether a link is selected, and if determined that a link is selected, the operation discrimination unit 13 notifies the fact to the viewing-area identification unit 16, the present invention is not limited thereto. In any case where the source page shifts to the destination page, even if no link is selected, the operation discrimination unit 13 may notify the shift to the destination page to the viewing-area identification unit 16. In this case, the operation discrimination unit 13 transmits document data acquired by the shift to the destination page to the display control unit 14 and the actual-display-area determination unit 17. Here, the case where a link displayed on the display device 11 is selected will be described as an example of the shift from the source page to the destination page.

The display control unit 14, an example of display means, generates a control signal for controlling display on the display device 11 to control the display on the display device 11. Here, the display control unit 14 generates a control signal including content to be displayed on the display device 11 based on the contact action received from the operation discrimination unit 13 and the document data. The display control unit 14 transmits the generated control signal to the display device 11 to cause the display device 11 to display a document or the like. The display control unit 14 transmits the control signal also to the operation discrimination unit 13 and the display-history storage unit 15. If a link displayed on the display device 11 is selected by the user, the display control unit 14 receives the position and the scaling percentage of the actual display area from the actual-display-area decision unit 18. The display control unit 14 generates a control signal based on the position and the scaling percentage of the actual display area received from the actual-display-area decision unit 18 and the document data of the destination page received from the operation discrimination unit 13 and transmits the generated control signal to the display device 11, the operation discrimination unit 13, and the display-history storage unit 15. The position of the actual display area is a position where the actual display area is present in the document data, which will be described in detail later. The scaling percentage of the actual display area is the scaling factor of the actual display area enlarged or reduced by a pinch-out operation or a pinch-in operation, which will be described in detail later.

When a Web browser is started and an operation for newly displaying a Web page is performed, the actual display area is in an initial state. The initial state can include various states; for example, the width of the actual display area is equal to the width of the entire Web page, and the upper left corner of the Web page is located at the upper left corner of the actual display area. Thus, the display control unit 14 generates a control signal based on the settings of the initial state of the actual display area and the document data of the newly displayed Web page received from the operation discrimination unit 13 and transmits the generated control signal to the display device 11, the operation discrimination unit 13, and the display-history storage unit 15.

The display-history storage unit 15 has storage means, such as a memory, and stores a moving history of the actual display area moving in the document data based on the control signal generated by the display control unit 14. If a request from the viewing-area identification unit 16 is given, the display-history storage unit 15 transmits the stored actual-display-area moving history to the viewing-area identification unit 16.

Figure 3:
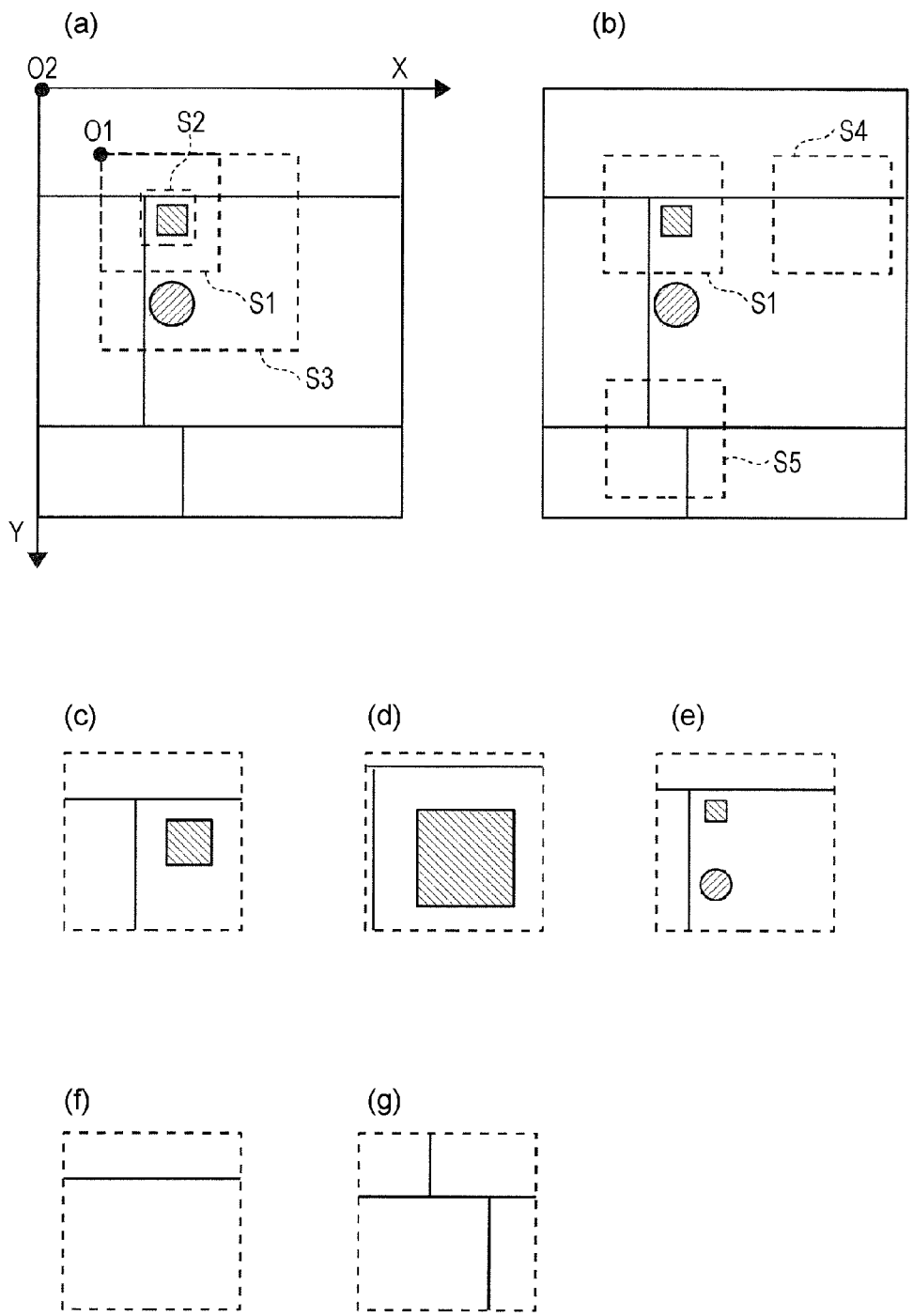
FIG. 3 is a diagram for explaining the moving action of an actual display area in document data.

FIG. 3 is a diagram for explaining the moving action of an actual display area in document data on a Web page. FIG. 3(*a*) is a diagram illustrating document data and an actual display area of a Web page displayed. Here, an orthogonal coordinate system is assumed for the document data. Assume that the upper left corner of the document data is the origin O2 (0, 0), the horizontal coordinate of the document data be the X-coordinate, and the vertical coordinate of the document data be the Y-coordinate. The document data shows the document or the like in a downward direction. The downward direction of the document data is defined as a positive direction of the Y-axis. Assuming that the upper left corner of the actual display area is the origin O1 of the display device 11, the position of the actual display area is determined by the values of the X-coordinate and the Y-coordinate of the origin O1 on the coordinates of the document data. The vertical length and the horizontal length of the actual display area are expressed by the distance in the Y-axis direction and the distance in the X-axis direction on the coordinates of the document data.

Reference signs S1 to S3 shown in FIG. 3(*a*) denote actual display areas at certain points in time. S2 is an actual display area in which an object displayed on the display device 11 is enlarged when the actual display area is S1. S3 is an actual display area in which objects displayed on the display device 11 are reduced when the actual display area is S1. FIG. 3(*c*) is a diagram illustrating the object displayed on the display device 11 when the actual display area is S1. Likewise, FIG. 3(*d*) is a diagram illustrating the object displayed on the display device 11 when the actual display area is S2, and FIG. 3(*e*) is a diagram illustrating the objects displayed on the display device 11 when the actual display area is S3.

When the object displayed on the display device 11 is enlarged, as shown in FIG. 3(*c*) and FIG. 3(*d*), the actual display area changes from S1 to S2, thus decreasing the area of the Web page displayed on the display device 11. In other words, the actual display area relative to the entire Web page decreases in size. Assuming that the scaling percentage of the actual display area is the vertical or horizontal length of the actual display area after the object is enlarged, divided by vertical or horizontal length of the actual display area before the object is enlarged, the scaling percentage becomes less than 1 by enlarging the object. When the object displayed on the display device 11 is reduced from that in FIG. 3(*c*) to that in FIG. 3(*e*), the scaling percentage of the actual display area becomes larger than 1. For example, assume that the scaling percentage is expressed with reference to the initial size of the actual display area (100%). Enlarging the displayed object from the initial state of the actual display area decreases the scaling percentage to less than 100%, and reducing the displayed object increases the scaling percentage to larger than 100%.

FIG. 3(*b*) is a diagram illustrating document data and a plurality of actual display areas. S1 denotes the same actual display area as S1 shown in FIG. 3(*a*), and S4 and S5 denote actual display areas at certain points in time. FIG. 3(*f*) is a diagram illustrating an object displayed on the display device 11 when the actual display area is S4. FIG. 3(*g*) is a diagram illustrating an object displayed on the display device 11 when the actual display area is S5. When an operation for moving the object displayed on the display device 11 leftwards in the negative direction of the X-axis is performed in the actual display area S1, the object is moved leftwards with respect to the display device 11. By this operation, the range of the Web page displayed on the display device 11 is moved rightwards with respect to the entire Web page. In other words, the position of the actual display area with respect to the entire Web page is moved rightwards. In the Web page shown in FIG. 3(*b*), for example, the actual display area is moved rightwards from S1 to S4. When an operation for moving the object displayed on the display device 11 upwards in the negative direction of the Y-axis is performed in the actual display area S1, the object is moved upwards with respect to the display device 11. By this operation, the range of the Web page displayed on the display device 11 is moved downwards with respect to the entire Web page. In other words, the position of the actual display area with respect to the entire Web page is moved downwards. In the Web page shown in FIG. 3(*b*), for example, the actual display area is moved downwards from S1 to S5. As described above, the user's contact action causes the size of the actual display area and the position of the actual display area in the document data to be changed. The display-history storage unit 15 stores the actual-display-area moving history, that is, document data, the X-coordinate and the Y-coordinate of the origin O1 of the actual display area in the coordinates of the document data, and the vertical and horizontal lengths of the actual display area all the time.

When the viewing-area identification unit 16, an example of identification means, receives a notification from the operation discrimination unit 13 that a link displayed on the display device 11 is selected, the viewing-area identification unit 16 requests the actual-display-area moving history stored in the display-history storage unit 15 from the display-history storage unit 15. The viewing-area identification unit 16 identifies an area (hereinafter referred to as a viewing area) including a document that the user may have actually viewed from among a plurality of areas obtained by dividing the document data based on the received actual-display-area moving history. This embodiment uses a viewing area as an example of a first target area. The plurality of areas may be the components of a layout displayed on the display device 11 or the components of a Web page read in block, although the areas may be any areas that can be obtained by dividing the document data. The plurality of areas obtained by dividing document data are hereinafter referred to as block elements. Assuming that the document data is an HTML document, block level elements that are blocks forming the frame of the document can be used as the block elements of this embodiment. A block level element in an HTML document sometimes has a common portion to another block level element, and thus the block level elements sometimes overlap with each other. Thus, dividing document data into a plurality of areas by using the block level elements of an HTML document needs to, for example, determine to which block level element the common portion at which block level elements overlap belongs based on predetermined rules. An example in which the block level elements of an HTML document are used as the block elements of this embodiment will be described hereinbelow. In this example, the block elements (block level elements) do not overlap with the other block elements (block level elements).

First, the viewing-area identification unit 16 identifies the time during which the user actually viewed a document or the like (hereinafter referred to as a viewing time) in the time during which a document or the like is displayed on the display device 11 based on the actual-display-area moving history received from the display-history storage unit 15. Specifically, the viewing-area identification unit 16 identifies the viewing time based on three conditions: a variation in the scaling percentage of the actual display area is within a predetermined variation; a variation in the downward moving speed of the actual display area in the document data is within a predetermined variation; and a variation in the lateral moving distance of the actual display area in the document data is within a predetermined variation. The details of a procedure for the viewing-area identification unit 16 to identify the viewing time will be described later. After identifying the viewing time, the viewing-area identification unit 16 identifies a block element that is displayed at the highest percentage on the display device 11 within the viewing time. Then, the viewing-area identification unit 16 determines that the block element that is displayed at the highest percentage on the display device 11 as a viewing area and transmits the viewing area to the actual-display-area determination unit 17 and the actual-display-area decision unit 18. The viewing-area identification unit 16 also transmits the scaling percentage of the actual display area during the viewing time to the actual-display-area decision unit 18. The details of a procedure for the viewing-area identification unit 16 to identify the viewing area will be described later.

The actual-display-area determination unit 17, which is an example of determination means, compares the document data of the source page and the document data on the destination page received from the operation discrimination unit 13 to determine whether to take over the settings on the actual display area from the source page. If the document structures of both pages are similar to each other, there is a high possibility that a document related to the document that the user read on the source page may be present on the destination page. Thus, when the user shifts to the destination page, displaying a block element of the destination page, an example of a second target area corresponding to the viewing area of the source page, in the same size as that of the viewing area of the source page eliminates the need for the user to perform an operation for displaying a desired portion in a desired size on the destination page. Thus, the actual-display-area determination unit 17 takes over the settings on the actual display area from the source page provided that fixed conditions for similarity between the document structures of both pages are satisfied. If the fixed conditions are not satisfied, the actual-display-area determination unit 17 does not take over the settings on the actual display area from the source page and restores the initial settings. The actual-display-area determination unit 17 transmits the determination result and the document data of the destination page and the document data of the source page to the actual-display-area decision unit 18. The details of the fixed conditions for the similarity between the document structures of both pages will be described later.

The actual-display-area decision unit 18, an example of decision means, decides the new position and scaling percentage of the actual display area based on the determination of the actual-display-area determination unit 17 and notifies the position and the scaling percentage to the display control unit 14. If the actual-display-area determination unit 17 determines to take over the settings on the actual display area from the source page, the actual-display-area decision unit 18 decides the position of the actual display area so that the upper left corner, which is the start position of a block element of the destination page corresponding to the viewing area of the source page, is located at the upper left corner of the display device 11, that is, the upper left corner of the actual display area. Furthermore, the actual-display-area decision unit 18 decides the scaling percentage of the actual display area during the viewing time as a new scaling percentage for the actual display area to equalize the size of the new actual display area to the size of the actual display area displayed on the display device 11. In contrast, if the actual-display-area determination unit 17 determines not to take over the settings on the actual display area from the source page, the actual-display-area decision unit 18 restores the initial settings on the actual display area and notifies the initial position and scaling percentage of the actual display area to the display control unit 14.

Procedure for Specifying Viewing Time

Figure 4:
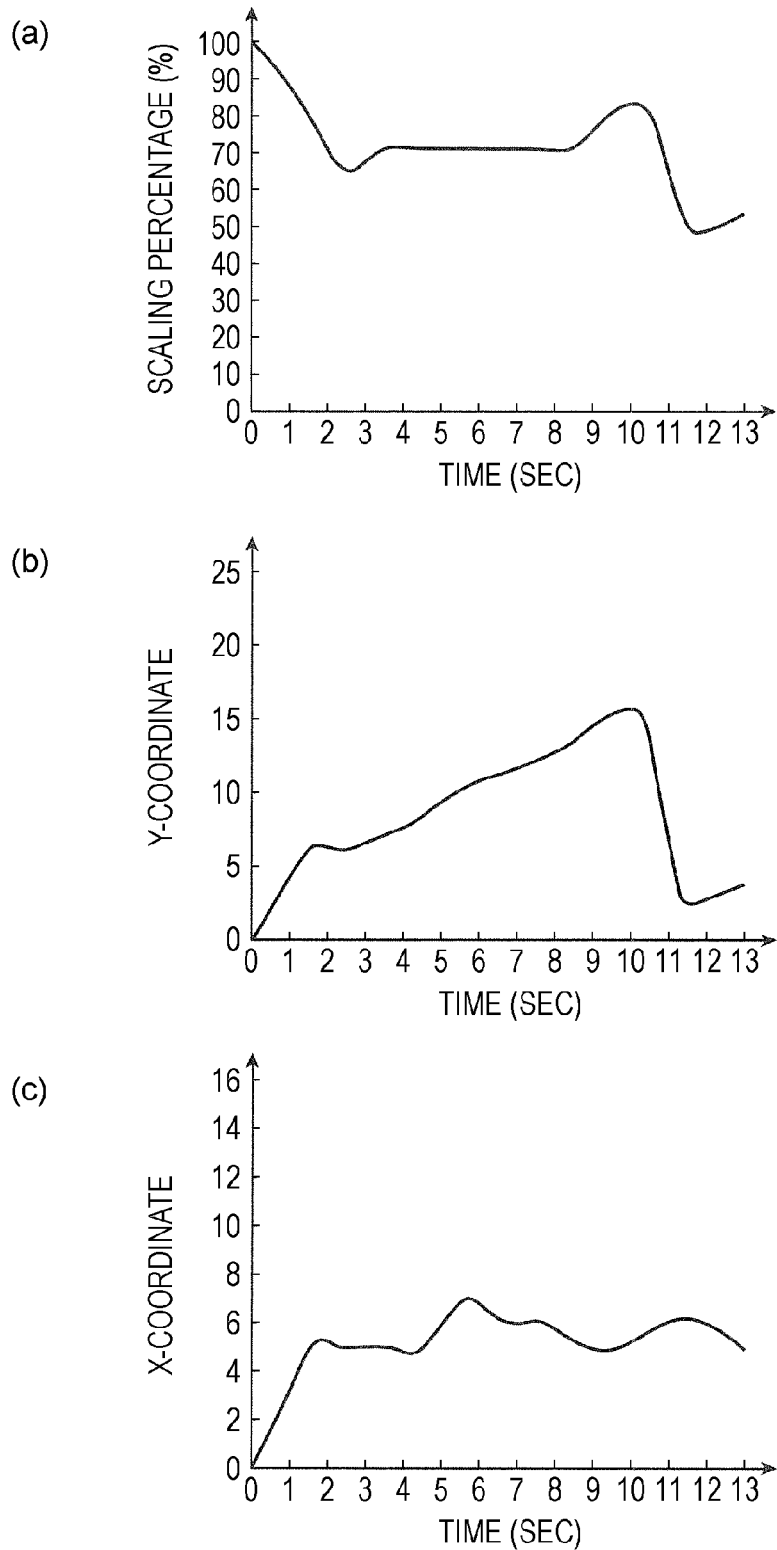
FIG. 4 shows graphs for explaining a procedure for a viewing-area identification unit to identify a viewing time.

FIG. 4 shows graphs for explaining a procedure for the viewing-area identification unit 16 to identify the viewing time. FIG. 4(*a*) is a graph showing the scaling percentage of the actual display area in chronological order. The vertical axis of the graph shown in FIG. 4(*a*) represents the scaling percentage (%), and the horizontal axis represents the time (in seconds). The scaling percentage of the actual display area uses the size of the actual display area in the initial state as the reference (100%). As described above, for the scaling percentage of the actual display area, a necessary condition for identifying the viewing time is that a variation in the scaling percentage is within a predetermined variation. In the example shown in FIG. 4(*a*), the scaling percentage of the actual display area during a timeframe from 4 to 9 seconds is substantially constant at 70%. This indicates that a variation in the scaling percentage of the actual display area is within the predetermined variation during 4 to 9 seconds, and thus, 4 to 9 seconds is extracted as a timeframe that satisfies the above condition.

FIG. 4(*b*) is a graph showing the average value of the Y-coordinates of the pixels of the actual display area of the document data in chronological order. The vertical axis of the graph shown in FIG. 4(*b*) represents the Y-coordinate of the coordinates of the document data, and the horizontal axis represents the time (in seconds). As described above, for the downward moving speed of the actual display area, a necessary condition for identifying the viewing time is that a variation in the downward moving speed is within a predetermined variation. In the example shown in FIG. 4(b), the inclination of the graph is substantially constant during a timeframe from 2 to 10 seconds, and the actual display area moves downward on the document data at a substantially constant speed. This indicates that a variation in the downward moving speed of the actual display area on the document data is within the predetermined variations during 2 to 10 seconds, and thus, 2 to 10 seconds is extracted as a timeframe that satisfies the above condition.

FIG. 4(c) is a graph showing the average value of the X-coordinates of the pixels of the actual display area of the document data in chronological order. The vertical axis of the graph shown in FIG. 4(c) represents the X-coordinate of the coordinates of the document data, and the horizontal axis represents the time (in seconds). As described above, for the lateral movement of the actual display area, a necessary condition for identifying the viewing time is that a variation in the lateral moving distance is within a predetermined variation. In the example shown in FIG. 4(c), the value of the X-coordinate is within a range from 4 to 7 during a timeframe from 2 to 12 seconds, and thus, a variation in the X-coordinate during this timeframe is small. This indicates that a variation in the lateral moving distance of the actual display area on the document data is within the predetermined variation during 2 to 12 seconds, and thus, 2 to 12 seconds is extracted as a timeframe that satisfies the above condition.

Thus, the above three conditions are satisfied during 4 to 9 seconds as conditions for the viewing-area identification unit 16 to identify the viewing time. Thus, the viewing-area identification unit 16 can identify a timeframe from 4 to 9 seconds as the viewing time.

In the example shown in FIG. 4, the viewing-area identification unit 16 identifies a viewing time that satisfies all of the three conditions; however, the present invention is not limited thereto. For example, the viewing-area identification unit 16 may identify a viewing time by weighting the three conditions, such as increasing the level of importance of the condition for a variation in scaling percentage. The user may sometimes read a document even if the lateral movement of the actual display area is somewhat large, as in the case where the lateral width of the block element is larger than that of the actual display area. Thus, the viewing-area identification unit 16 may identify a viewing time, for example, when the other two conditions except the condition for the lateral movement of the actual display area are satisfied.

Before and after the user reads a document, an operation for moving to a document start position or an operation for enlarging or reducing the document on the display device 11 is usually performed. This may cause a change in the moving speed before and after the user reads the document. For example, during 0 to 2 seconds and during 10 to 12 seconds, movement to a document start position, or enlargement or reduction of the actual display area is performed, and thus, the inclination of the graph in FIG. 4(a) increases relative to the moving speed during 2 to 10 seconds. If the moving speed is too high for the user to read the document, the time can be excluded from the viewing time. Thus, the viewing-area identification unit 16 may have a predetermined threshold value as a high-limit moving speed at which the user can read a document. For example, when identifying a time that satisfies the three conditions, the viewing-area identification unit 16 may first determine whether a time during which the moving speed exceeds the threshold value is present, and may exclude the time during which the moving speed exceeds the threshold value from the viewing time as a time during which the user is not reading the document.

Furthermore, if there are a plurality of times that satisfy the conditions for the viewing time, a plurality of block elements may be present in the source page that the user read. When the user shifts to the destination page, a block element of the destination page corresponding to the block element of the source page that user read first may be displayed at first. Thus, the viewing-area identification unit 16 may identify, among the plurality of times, the first time during which the user first read the block element as a viewing time.

Procedure for Identifying Viewing Area

FIG. 5 is a diagram for explaining an example of a procedure for the viewing-area identification unit 16 to identify a viewing area. FIG. 5(a) is a diagram showing the locations of an actual display area in document data at each time T of the viewing time identified in the example shown in FIG. 4. In the example shown in FIG. 4(a), the viewing time is a timeframe from 4 to 9 seconds. Thus, the example in FIG. 5(a) shows the locations of the actual display area at each time T of 4 to 9 seconds. For example, in the case of T=4, the location of the actual display area at 4 seconds is shown. Likewise, in the case of T=5, the location of the actual display area at 5 seconds is shown, and in the case of T=6, the location of the actual display area at 6 seconds is shown. Reference signs F1 to F6 denote block elements. At T=4, F1 to F4 are displayed on the display device 11. Likewise, at T=5, F2 to F4 are displayed, and at T=6, F2 and F3 are displayed.

FIG. 5(b) is a diagram showing the percentages of areas of the block elements in FIG. 5(a) displayed on the display device 11 at each time T of the identified viewing time. The vertical axis of the graph shown in FIG. 5(b) represents the percentages (%) of the areas of the individual block elements, and the horizontal axis represents the time T (in seconds). For example, in the case of T=4, the percentages of the individual block elements displayed on the display device 11 at 4 seconds are shown: 10% for F1, 10% for F2, 70% for F3, and 10% for F4. In the case of T=5, the percentages of the individual block elements displayed on the display device 11 at 5 seconds are shown: 10% for F2, 85% for F3, and 5% for F4. In the case of T=6, the percentages of the individual block elements displayed on the display device 11 at 6 seconds are shown: 10% for F2, and 90% for F3. The viewing-area identification unit 16 thus calculates the percentages of the individual block elements displayed during the viewing time. The viewing-area identification unit 16 identifies a block element that is displayed at the highest percentage on the display device 11 during the viewing time. In the example shown in FIG. 5, the viewing-area identification unit 16 identifies a block element that is displayed at the highest percentage on the display device 11 during 4 to 9 seconds. F3 is identified as a viewing area because it is displayed at the highest percentage.

If there is a plurality of block elements that are displayed at the highest percentage on the display device 11 during the viewing time, there may be a plurality of block elements on the source page that the user read. On the destination page, the user may read the document in order from above or from the left on the Web page. Thus, the uppermost or the leftmost block element of the plurality of block elements on the Web page may be identified as a viewing area.

Furthermore, the viewing-area identification unit 16 may have a predetermined threshold value for the percentage of display. In this case, the viewing-area identification unit 16 identifies block elements that are displayed at percentages higher than the threshold value as viewing areas. If there are a plurality of block elements displayed at percentages higher than the threshold value, the uppermost or leftmost block element on the Web page may be identified as a viewing area, as described above. If there is no block element displayed at a percentage higher than the threshold value, the actual-display-area determination unit 17 may determine not to take over the settings on the actual display area from the source page and may reset the settings on the actual display area.

Fixed Condition for Determining that Document Structures are Similar

FIG. 6 is a diagram showing an example of the document structures of the source page and the destination page. Assume that the documents of both pages have an HTML structure; for example, the block element F3, which is the viewing area shown in FIG. 5, is started at the 17th line (<div class="inner">) from the first line of the document on both pages. In the document structure shown in FIG. 6, a certain block element is started at the first line (<div class="outBody">) on both pages, and the class names of both pages are the same. Next, another block element is started at the second line (<div class="inBody">) on both pages, and the class names of both pages are the same. Also at the fourth, sixth, ninth, 12th, 16th, 17th, and the other lines, block elements are started, and the class names or ID names of the corresponding block elements on both pages are the same. When the class names or ID names of block elements constituting the hierarchy of the HTML document are the same, there is a high possibility that the document structures of both pages are similar to each other. Thus, for example, if the class names or ID names of block elements with a hierarchical structure, from the first line to a line at which a viewing area is started (the 17th line in the example shown in FIG. 5) of the document data, are the same, the fixed condition may be set such that the document structures of both pages are determined to be similar to each other.

The fixed condition for determining whether the document structures of both pages are similar is not limited to the above example. For example, the fixed condition may be such that, for the first line of the document data to a line at which the viewing area starts, the percentage of the same character strings on both pages is higher than a predetermined percentage. In another example, the first line to a predetermined line of the document data may be determined to be a comparison area for both pages, and the fixed condition may be such that the percentage of lines having the same character strings in the area is higher than a predetermined percentage on both pages.

Alternatively, the actual-display-area determination unit 17 may compare the uniform resource locators (URLs) of both pages before comparing the document structures. For example, if the domain names of the URLs of the source page and the destination page differ, there is a high possibility that the document structures are not similar to each other. Thus, for example, the actual-display-area determination unit 17 first compares the domain names of the URLs of the source page and the destination page before comparing the document structures, and if the domain names of both pages differ, may determine not to take over the settings on the actual display area from the source page without comparing the document structures.

Procedure for Deciding Actual Display Area

Figure 7:
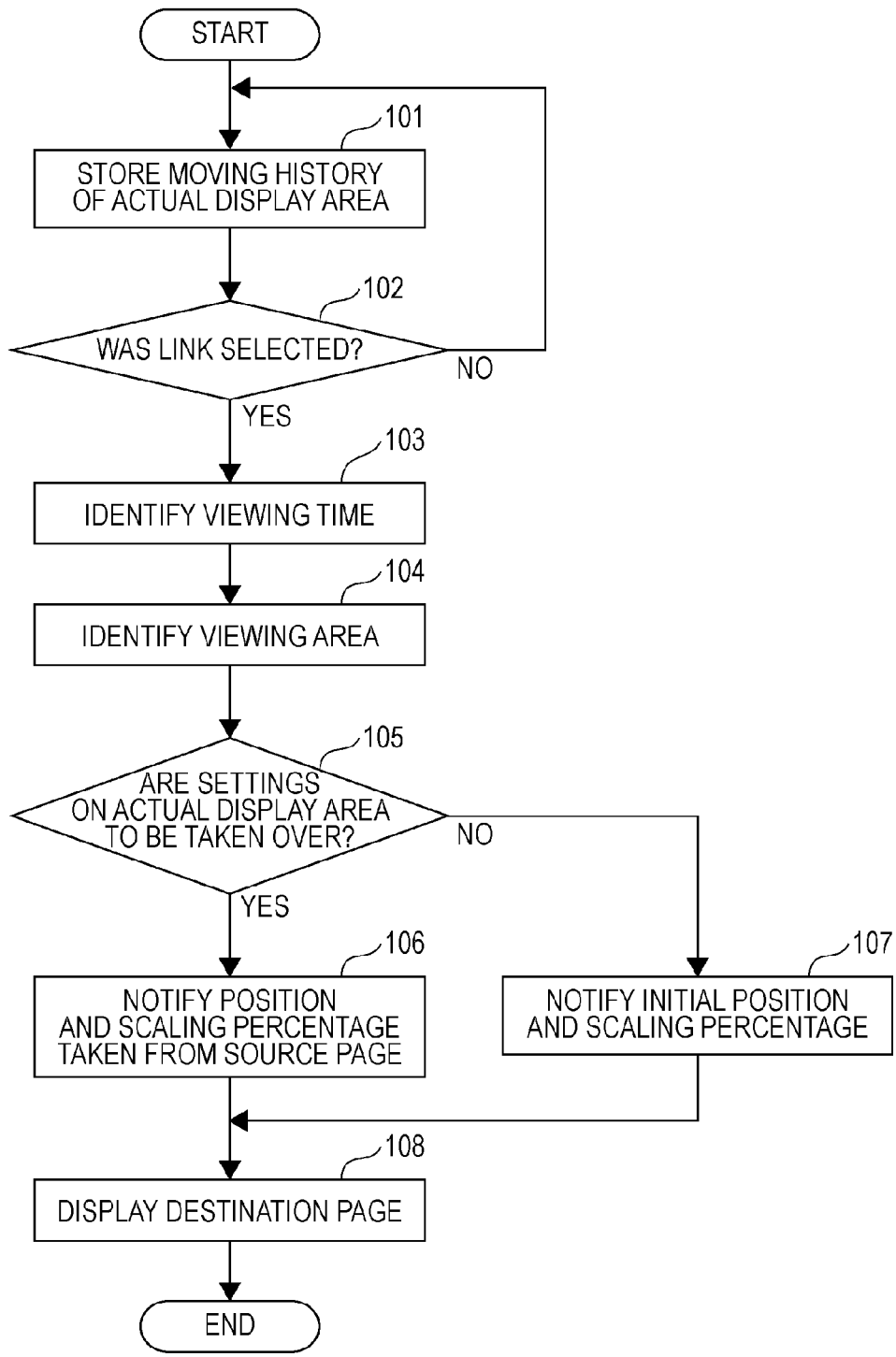
FIG. 7 is a flowchart showing an example of a procedure for deciding an actual display area.

FIG. 7 is a flowchart showing an example of a procedure for the computer 1 to decide an actual display area. Suppose that a Web page is displayed on the display device 11. When the user brings a finger into contact with the display device 11, the operation detection unit 12 detects the user's contact action on the display device 11, and the operation discrimination unit 13 determines the kind of the detected contact action. The display control unit 14 generates a control signal based on the contact action and the document data received from the operation discrimination unit 13. The display device 11 displays an object in correspondence with the contact action based on the generated control signal. The display-history storage unit 15 stores the moving history of the actual display area on the display device 11 (step 101). The operation discrimination unit 13 determines whether a link displayed on the display device 11 has been selected (step 102).

If a link displayed on the display device 11 is selected (Yes in step 102), the viewing-area identification unit 16 requests the actual-display-area moving history stored in the display-history storage unit 15 from the display-history storage unit 15. The viewing-area identification unit 16 identifies a viewing time based on the three conditions that a variation in the scaling percentage of the actual display area is within a predetermined variation; a variation in the downward moving speed of the actual display area in the document data is within a predetermined variation; and a variation in the lateral moving distance of the actual display area in the document data is within a predetermined variation, using the received actual-display-area moving history (step 103).

Next, the viewing-area identification unit 16 identifies a block element that is displayed at the highest percentage on the display device 11 during the viewing time identified as a viewing area in step 103 (step 104). The viewing-area identification unit 16 transmits the identified viewing area to the actual-display-area determination unit 17 and the actual-display-area decision unit 18. The viewing-area identification unit 16 also transmits the scaling percentage of the actual display area during the viewing time to the actual-display-area decision unit 18. In the example, shown in FIG. 4(*a*), the viewing-area identification unit 16 determines the scaling percentage during the viewing time to be 70% and transmits the scaling percentage to the actual-display-area decision unit 18.

Next, the actual-display-area determination unit 17 compares the document data of the source page and the document data of the destination page received from the operation discrimination unit 13 to determine whether to take over the settings on the actual display area from the source page (step 105). If the document structures of both pages satisfy the fixed conditions for similarity, the actual-display-area determination unit 17 determines to take over the settings on the actual display area from the source page (Yes in step 105).

Next, if the actual-display-area determination unit 17 determines to take over the settings on the actual display area from the source page, the actual-display-area decision unit 18 decides the position and the scaling percentage of the actual display area to be newly set and notifies the position and the scaling percentage to the display control unit 14 (step 106). Here, the actual-display-area decision unit 18 decides the position of the actual display area so that the upper left corner of a block element on the destination page corresponding to the viewing area on the source page is located at the upper left corner of the actual display area. Specifically, the actual-display-area decision unit 18 determines, as the position of the actual display area, the values of the X-coordinate and the Y-coordinate of the orthogonal coordinate system of the document data of the destination page. In the example shown in FIG. 4, FIG. 5, and FIG. 6, the position of the actual display area is decided so that the upper left corner of a block element of the destination page corresponding to F3 is located at the upper left corner of the actual display area. The actual-display-area decision unit 18 decides the scaling percentage of the actual display area during the viewing time identified by the viewing-area identification unit 16 as a new scaling percentage for the actual display area.

If a portion in which the same object or the same text, such as a document or an image, is described is present at the start position of the block element of the destination page and the start position of the viewing area of the source page, the identical portion of the start positions can be a regular-form sentence, the same advertisement, or the like. Thus, the actual-display-area decision unit 18 may skip the identical portion and may decide the position of the actual display area so that a portion in which a difference between the block elements of both pages is detected is located, as a new start position of the destination page, at the upper left corner of the actual display area.

In contrast, if the actual-display-area determination unit 17 determines not to take over the settings on the actual display area from the source page (No in step 105), the actual-display-area decision unit 18 resets the settings on the actual display area and notifies the initial position and scaling percentage of the actual display area to the display control unit 14 (step 107).

Next, the display control unit 14 generates a control signal for displaying the destination page on the display device 11 to display the destination page on the display device 11 (step 108). In other words, if the settings on the actual display area taken over from the source page are notified by the actual-display-area decision unit 18, the display control unit 14 causes the display device 11 to display a block element of the destination page corresponding to the viewing area of the source page. When the display control unit 14 is notified of the initial settings on the actual display area, the display control unit 14 causes the display unit 11 to display the actual display area without taking over the information on the source page so that, for example, the lateral width of the actual display area matches the lateral width of the Web page, and the upper left corner of the Web page is located at the upper left corner of the actual display area.

As described above, on the new Web page, the actual-display-area determination unit 17 determines whether to take over the settings on the initial actual display area of the Web page, and if the document structures of both pages satisfy the fixed condition for the similarity, takes over the settings on the actual display area. Taking over the settings on the actual display area allows a user's desired portion of a new Web page to be displayed in a desired size on the screen without the need for a user's operation, thus reducing the user's operation.

This embodiment shows an example in which the fixed condition for determining the similarity of document structures is based on the information on the HTML structure; however, the present invention is not limited thereto. Any information that allows comparison between the document structures displayed on the source page and the destination page may be used. An example is a method for comparing document structures using image recognition based on patterns.

Example Hardware Configuration of Computer

Figure 8:
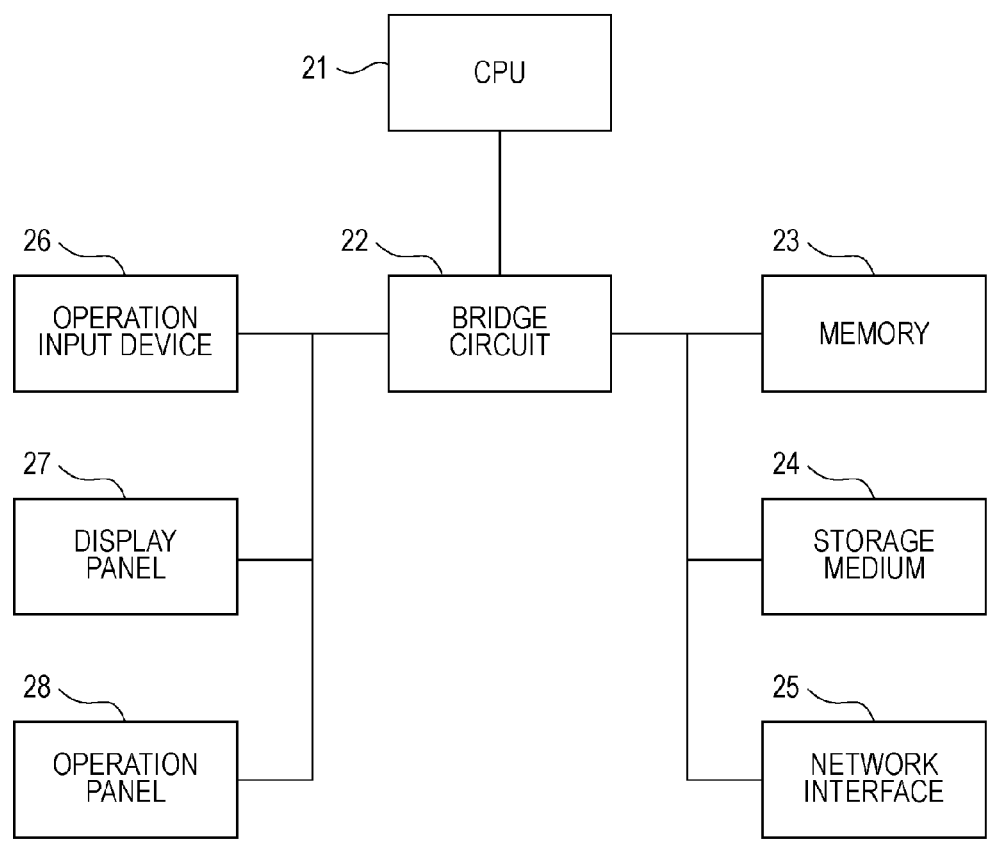
FIG. 8 is a diagram showing a computer hardware configuration to which an embodiment of the present invention can be applied.

Finally, a computer hardware configuration suitable for application of this embodiment will be described. FIG. 8 is a diagram showing an example of the computer hardware configuration. The computer shown in FIG. 8 includes a central processing unit (CPU) 21 serving as calculation means, a bridge circuit 22, a memory 23, a storage medium 24, a network interface 25, an operation input device 26, a display panel 27, and an operation panel 28. These components are connected to the CPU 21 serving as calculation means via the bridge circuit 22.

The storage medium 24 stores an OS and programs for application software. By loading these programs into the memory 23 and executing them with the CPU 21, various functions, such as a function of the operation discrimination unit 13 for discriminating a contact action, a function of the display control unit 14 for controlling display, and a function of the display-history storage unit 15 for storing a moving history, are achieved. Furthermore, by executing these programs with the CPU 21, various functions, such as a function of the viewing-area identification unit 16 for identifying a viewing area, a function of the actual-display-area determination unit 17 for determining whether to take over settings on the actual display area, and a function of the actual-display-area decision unit 18 for deciding settings on the actual display area, are achieved. The moving history stored in the display-history storage unit 15 is stored in the storage medium 24. The display panel 27 serves as the display device 11, and the operation panel 28 serves as the operation detection unit 12. Document data coming from the external server or the like is received via the network interface 25.

Mobile phones, smartphones, and tablet terminals sometimes have small display areas, unlike PCs. For that, when browsing a Web page, the user commonly enlarges or reduces the document or moves its display position so that a desired portion is displayed in a desired size on the screen. For example, an apparatus having a touch panel, such as a smartphone or a tablet terminal, can discriminate among various contact actions of the user on the screen by using the touch panel and can reflect the contact actions as input to the display. Examples of the contact actions include a swipe operation for moving the display position on the screen by moving the finger position while keeping a finger (touch pen) in contact with the touch panel, as shown in FIG. 9(a); a pinch-in operation for reducing an object on the screen by narrowing the distance between two fingers placed on the touch panel, as shown in FIG. 9(b); and a pinch-out operation for enlarging an object on the screen by increasing the distance between two fingers placed on the touch panel, as shown in FIG. 9(c). Such operations allow the user to display a desired portion in a desired size on the screen. However, the user's operation is reset when shifting to a new Web page. For this reason, the user adjusts the display again so that a desired portion is displayed in a desired size on the new Web page on the screen.

One known area of the prior art solves the above problem as follows. When the display size of a first Web page is changed by the user, the display size of a second Web page is changed correspondingly. For example, if the user's operation is enlargement, the entire second Web page or a selected object (for example, an image object) in the second Web page is enlarged. However, with this related art, when the user wants to read the continuance of information in a particular display area on the first Web page, the user has to visually search the second Web page for the desired information when the first Web page shifts to the second Web page.

An object of the present invention is to provide an apparatus that displays a document file, such as a Web page, in which an operation for displaying a desired portion in a desired size on a screen when the initial display unit shifts to a new display unit is reduced.

To achieve the above object, the present invention is implemented as a computer. The computer includes display means for displaying a document file on a display device; identification means for identifying, of a plurality of areas obtained by dividing a first display unit, a first target area viewed by a viewer based on the history of a display area actually displayed on the display device in the first display unit, the display unit being a unit in which the document file is displayed by the display means; determination means for determining, when the display unit displayed on the display device shifts from the first display unit to a second display unit different from the first display unit, whether to use setting information on the display area when the first target area identified by the identification means is displayed, based on the structure of the first display unit and the structure of the second display unit; and decision means for deciding, when the determination means determines to use the setting information, to display a second target area of the second display unit corresponding to the first target area by using the setting information, and when the determination means determines not to use the setting information, deciding to display the second display unit by using predetermined initial-setting information.

Preferably, the identification means of the computer identifies a viewing time during which the viewer viewed the first display unit based on the history, and identifies, of the plurality of areas, an area displayed at the highest percentage on the display device during the viewing time as the first target area. More preferably, the identification means of the computer identifies, as the viewing time, a time that satisfies predetermined conditions for a variation in the moving speed of the display area due to movement of the display area in the first display unit, a variation in the moving distance of the display area due to movement of the display area, and a variation in the size of the display area due to a change in the size of the display area. More preferably, if the determination means determines that a fixed condition for the similarity of the structures of the first display unit and the second display unit is satisfied based on the structure of the first display unit and the structure of the second display unit, the determination means of the computer determines to use the setting information.

More preferably, if the determination means determines to use the setting information, the decision means of the computer decides to display the second target area such that the size of an area actually displayed in the display device in the second display unit is equal to the size of the display area when the first target area is displayed on the display device, and that the start position of the second target area is located at a predetermined position of the display device. More preferably, if the determination means determines to use the setting information, and if an identical object is present at the start position of the first target area and at the start position of the second target area, the decision means of the computer decides to display the second target area such that a position excluding the object from the second target area is disposed at the predetermined position of the display device. More preferably, the document file is an HTML file, and the plurality of areas are a plurality of block level elements in the HTML file.

Further, the present invention is implemented as the following computer. The computer includes detection means for detecting a contact action on a display device; display means for displaying a document file on the display device in accordance with the contact action detected by the detection means; identification means for identifying, of a plurality of areas obtained by dividing a first display unit, a first target area viewed by a viewer based on the history of a display area actually displayed on the display device in the first display unit, the display unit being a unit in which the document file is displayed by the display means; determination means for determining, when the display unit displayed on the display device shifts from the first display unit to a second display unit different from the first display unit, whether to use setting information on the display area when the first target area identified by the identification means is displayed, based on the structure of the first display unit and the structure of the second display unit; and decision means for deciding, when the determination means determines to use the setting information, to display a second target area of the second display unit corresponding to the first target area by using the setting information, and when the determination means determines not to use the setting information, deciding to display the second display unit by using predetermined initial-setting information.

Furthermore, the present invention includes the steps of displaying a document file on a display device; identifying, of a plurality of areas obtained by dividing a first display unit, a first target area viewed by a viewer based on the history of a display area actually displayed on the display device in the first display unit, the display unit being a unit in which the document file is displayed; determining, when the display unit displayed on the display device shifts from the first display unit to a second display unit different from the first display unit, whether to use setting information on the display area when the identified first target area is displayed, based on the structure of the first display unit and the structure of the second display unit; and deciding, when it is determined that the setting information is to be used, to display a second target area in the second display unit corresponding to the first target area by using the setting information, and when it is determined that the setting information is not to be used, deciding to display the second display unit by using predetermined initial-setting information.

Furthermore, the present invention is implemented as a program for implementing the functions of the above apparatus by controlling a computer, or a program for causing a computer to perform processes corresponding to the steps of the above method. The program may be provided by distributing a magnetic disk, an optical disk, a semiconductor memory, or another storage medium that stores the program or via a network.

To reduce an operation for displaying a user's desired portion in a desired size on a screen while shifting to a new Web page.

As described herein, a computer 1 includes, as functional components mainly for data inputting and outputting, a display device 11 that displays characters, graphics, or images in response to a control signal, an operation detection unit 12 that detects a contact action of the user, an operation discrimination unit 13 that determines the kind of the user's contact action, and a display control unit 14 that controls display on the display device 11. The computer 1 further includes, as functional components mainly for data processing, a display-history storage unit 15 that stores the moving history of a displayed area, a viewing-area identification unit 16 that identifies an area including a document that the user seems to have actually viewed, an actual-display-area determination unit 17 that determines whether to take over settings on the displayed area from the source page, and an actual-display-area decision unit 18 that decides the position and the scaling percentage of the displayed area.

The present invention thus allows an apparatus that displays a document file, such as a Web page, to reduce an operation for displaying a desired portion in a desired size on a screen when the initial display unit shifts to a new display unit.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
a processor; and a computer-readable storage medium having program instructions embodied therewith, the program instructions executable by the processor to cause the processor to:
display a document file on a display device; divide a first display unit into a plurality of areas, wherein the first display unit is a unit in which the document file is displayed by the system;
identify, from the plurality of areas obtained by the system dividing the first display unit, a first target area viewed by a viewer based on a history of a display area actually being displayed on the display device in the first display unit;
detect a selection of a hyperlink displayed on the display device in the first display unit, the hyperlink being a link to a destination page of a second display unit, wherein the source page and the destination are two different webpages;
determine, in response to the first target area being displayed on the display device shifting from the first display unit to the second display unit that is different from the first display unit in response to the detected selection of the hyperlink, whether to use setting information from the display area when the first target area identified by the system is displayed, based on a structure of the first display unit and a structure of the second display unit, wherein the setting information is the size of a viewing area of the document file within the first target area;
determine that a fixed condition for a similarity of a document structure of a source page of the first display unit and a document structure of the destination page of the second Page 2 of 16 application Ser. No. 14/196, 109 Reply to Office Action of Jun. 15, 2017 display unit is satisfied based on the document structure of the source page of the first display unit and the document structure of the second display unit, wherein the document structure of the source page and the document structure of the destination page are HTML structures that includes one or more character strings;
determine to use the setting information in the destination page as was used in the display area of the source page; and
in response to the determining to use the setting information from the display area, display a second target area of the second display unit corresponding to the first target area by using the setting information from the display area, and in response to determining not to use the setting information from the display area, display the second display unit by using predetermined initial-setting information.

2. The system according to claim 1, wherein the processor further identifies a viewing time during which the viewer viewed the first display unit based on the history of the display area actually being displayed on the display device in the first display unit, wherein the viewing time is a scaling percentage of the actual display area to the size of the actual display area in the initial sate as a function of time, and wherein the processor further identifies the first target area as being an area, from the plurality of areas, that is displayed at a highest amount of time on the display device during the viewing time as compared with other areas from the plurality of areas.

3. The system according to claim 2, wherein the processor further identifies the viewing time as a time that satisfies predetermined conditions for a variation in a moving speed of the display area due to scrolling of the display area in the first display unit, a variation in a moving distance of the display area due to scrolling of the display area, and a variation in a size of the display area due to a change in a size of the display area.

4. The system according to claim 1, wherein in response to the processor determining to use the setting information from the display area, the processor further displays the second target area such that a size of an area actually displayed in the display device in the second display unit is equal to a size of the display area when the first target area is displayed in the display device, and wherein a start position of the second target area is located at a predetermined position of the display device.

5. The system according to claim 4, wherein in response to the processor determining to use the setting information from the display area, and in response to an identical object being present at a start position of the first target area and at the start position of the second target area, the processor further displays the second target area such that a position excluding the identical object from the second target area is disposed at the predetermined position of the display device.

6. The system according to claim 1, wherein the document file is an HTML file, and wherein the plurality of areas are a plurality of block level elements in the HTML file.

7. A method for displaying a document file, the method comprising:
displaying, by one or more processors, a document file on a display device;
dividing, by one or more processors, a first display unit into a plurality of areas, wherein the first display unit is a unit in which the document file is displayed;
identifying, by one or more processors and from the plurality of areas obtained by dividing the first display unit, a first target area viewed by a viewer based on a history of a display area actually being displayed on the display device in the first display unit;
detecting a selection of a hyperlink displayed on the display device in the first display unit, the hyperlink being a link to a destination page of a second display unit, wherein the source page and the destination are two different webpages;
determining, by one or more processors and in response to the first target area being displayed on the display device shifting from the first display unit to the second display unit that is different from the first display unit in response to the detected selection of the hyperlink, whether to use setting information from the display area when the first target area identified by the identification means is displayed, based on a structure of the first display unit and a structure of the second display unit, wherein the setting information is the size of a viewing area of the document file within the first target area;
determining that a fixed condition for a similarity of a document structures of a source page of the first display unit and a document structure of the destination page of the second display unit is satisfied based on the document structure of the source page of the first display unit and the document structure of the destination page of the second display unit, wherein the document structure of the source page and the document structure of the destination page is an HTML structure that includes one or more character strings;

utilizing, by one or more processors, the setting information from the display area in the destination page as was used in the display area of the source page; and in response to deciding to use the setting information from the display area, displaying, by one or more processors, a second target area of the second display unit corresponding to the first target area by using the setting information from the display area.

8. The method of claim 7, further comprising:
in response to one or more processors deciding not to use the setting information from the display area, displaying, by one or more processors, the second display unit by using predetermined initial-setting information.

9. The method of claim 7, further comprising:
identifying, by one or more processors, a viewing time during which the viewer viewed the first display unit based on the history of the display area actually being displayed on the display device in the first display unit, wherein the viewing time is a scaling percentage of the actual display area to the size of the actual display area in the initial sate as a function of time; and identifying, by one or more processors, the first target area as being an area, from the plurality of areas, that is displayed at a highest amount of time on the display device during the viewing time as compared with other areas from the plurality of areas.

10. The method of claim 9, further comprising:
identifying as the viewing time, by one or more processors, a time that satisfies predetermined conditions for a variation in a moving speed of the display area due to scrolling of the display area in the first display unit, a variation in a moving distance of the display area due to scrolling of the display area, and a variation in a size of the display area due to a change in a size of the display area.

11. The method of claim 7, further comprising:
in response to determining to use the setting information from the display area, displaying, by one or more processors, the second target area such that a size of an area actually displayed in the display device in the second display unit is equal to a size of the display area when the first target area is displayed in the display device, and wherein a start position of the second target area is located at a predetermined position of the display device.

12. The method of claim 11, further comprising:
in response to determining to use the setting information from the display area, and in response to an identical object being present at a start position of the first target area and at the start position of the second target area, displaying, by one or more processors, the second target area such that a position excluding the identical object from the second target area is disposed at the predetermined position of the display device.

13. The method of claim 7, wherein the document file is an HTML file, and wherein the plurality of areas are a plurality of block level elements in the HTML file.

14. A computer program product for displaying a document file, the computer program product comprising a non-transitory computer readable storage medium having program code embodied therewith, the program code readable and executable by a processor to perform a method comprising:
displaying a document file on a display device;
dividing a first display unit into a plurality of areas, wherein the first display unit is a unit in which the document file is displayed;

identifying, from the plurality of areas obtained by dividing the first display unit, a first target area viewed by a viewer based on a history of a display area actually being displayed on the display device in the first display unit;

detecting a selection of a hyperlink displayed on the display device in the first display unit, the hyperlink being a link to a destination page of a second display unit, wherein the source page and the destination are two different webpages;

determining, in response to the first target area being displayed on the display device shifting from the first display unit to the second display unit that is different from the first display unit in response to the detected selection of the hyperlink, whether to use setting information from the display area when the first target area identified by the identification means is displayed, based on a structure of the first display unit and a structure of the second display unit, wherein the setting information is the size of a viewing area of the document file within the first target area;

determining that a fixed condition for a similarity of a document structures of a source page of the first display unit and a document structure of the destination page of the second display unit is satisfied based on the document structure of the source page of the first display unit and the document structure of the destination page of the second display unit, wherein the document structure of the source page and the document structure of the destination page is an HTML structure that includes one or more character strings;

utilizing, by one or more processors, the setting information from the display area in the destination page as was used in the display area of the source page; and in response to deciding to use the setting information from the display area, displaying a second target area of the second display unit corresponding to the first target area by using the setting information from the display area.

15. The computer program product of claim 14, wherein the method further comprises:
in response to deciding not to use the setting information from the display area, displaying the second display unit by using predetermined initial-setting information.

16. The computer program product of claim 15, wherein the method further comprises:
identifying a viewing time during which the viewer viewed the first display unit based on the history of the display area actually being displayed on the display device in the first display unit, wherein the viewing time is a scaling percentage of the actual display area to the size of the actual display area in the initial sate as a function of time; and identifying the first target area as being an area, from the plurality of areas, that is displayed at a highest amount of time on the display device during the viewing time as compared with other areas from the plurality of areas.

17. The computer program product of claim 14, wherein the method further comprises:
identifying the viewing time as a time that satisfies predetermined conditions for a variation in a moving speed of the display area due to scrolling of the display area in the first display unit, a variation in a moving distance of the display area due to scrolling of the display area, and a variation in a size of the display area due to a change in a size of the display area.

18. The method of claim 7, wherein the determining that the fixed condition for the similarity of the document structure of the source page of the first display unit and the document structure of the destination page of the second display unit is satisfied includes:

comparing a domain name of a source page uniform resource locator to a domain name of a destination page uniform resource locator;

determining that the source page domain name is similar to the destination page domain name;

comparing a first portion of the character strings of the source page to a first portion of the character strings of the destination page;

determining, based on the comparison between the source page and the destination page, a percentage of the character strings of the portion of the HTML structure of the source page that matches the character strings of the portion of the HTML structure of the destination page; and determining that the percentage exceeds a predetermined threshold.

19. The method of claim 7, further comprising:

requesting, by an operation discrimination unit and from an external server located within the display device, document data of the destination webpage that includes moving action of the document data within the display device and the setting information;

acquiring, by the operation discrimination unit and from the external server, the document data;

determining whether the displayed hyperlink was selected by a user based on a contact action;

determining a viewing time that the viewer viewed the first target area;

transmitting, by the operation discrimination unit and to the display control unit and to the actual-display-area determination unit, the acquired document data of the destination webpage in response to determining the displayed hyperlink was selected by the user;

receiving, by the display control unit and from the actual-display-area decision unit, a position and a scaling percentage of an actual display area, wherein the position is a position where the actual display area is present in the document data, and wherein the scaling percentage is a scaling factor of the actual display area enlarged by zooming in;

generating a control signal that includes content to be displayed on the display device based on the contact action and the document data; and transmitting the generated control signal to the display device to cause the display device to display the destination webpage using the position and scaling percentage.

20. The method of claim 7, further comprising:

determining that the source page and the destination page include an identical portion of content; and determining a position of the destination page that skips the identical portion of content, wherein displaying the second target area of the second display unit corresponding to the first target area by using the setting information from the display area further comprises displaying the destination page at the position of the destination page that skips the identical portion of content.

* * * * *